(12) United States Patent
Yoshikane et al.

(10) Patent No.: US 8,967,922 B2
(45) Date of Patent: Mar. 3, 2015

(54) DUST COLLECTING ATTACHMENT

(75) Inventors: Kiyonobu Yoshikane, Anjo (JP);
Yoshitaka Machida, Anjo (JP);
Masanori Furusawa, Anjo (JP);
Yoshihiro Kasuya, Anjo (JP)

(73) Assignee: Makita Corporation, Anjo (JP)

( * ) Notice: Subject to any disclaimer, the term of this patent is extended or adjusted under 35 U.S.C. 154(b) by 1006 days.

(21) Appl. No.: 12/829,956

(22) Filed: Jul. 2, 2010

(65) Prior Publication Data
US 2011/0008118 A1 Jan. 13, 2011

(30) Foreign Application Priority Data
Jul. 10, 2009 (JP) .................................. 2009-163980

(51) Int. Cl.
*B23Q 11/00* (2006.01)
(52) U.S. Cl.
CPC ................................. *B23Q 11/0046* (2013.01)
USPC ............................................ 408/67; 175/209
(58) Field of Classification Search
USPC ............... 408/67; 175/209, 19.6, 75, 82, 152; 279/19.6, 75, 82
See application file for complete search history.

(56) References Cited

U.S. PATENT DOCUMENTS

| | | | | |
|---|---|---|---|---|
| 2,246,916 | A * | 6/1941 | Fischer | 408/56 |
| 3,339,435 | A * | 9/1967 | Heitz | 408/67 |
| 4,955,984 | A * | 9/1990 | Cuevas | 408/67 |
| 5,292,210 | A | 3/1994 | Nowick | |
| 6,131,671 | A | 10/2000 | Shibata et al. | |
| 7,121,774 | B2 * | 10/2006 | Hirt et al. | 408/240 |
| 7,634,835 | B2 * | 12/2009 | Simm et al. | 15/339 |
| 7,740,086 | B2 * | 6/2010 | Bleicher et al. | 173/198 |
| 7,901,164 | B2 * | 3/2011 | Skradski et al. | 408/67 |

FOREIGN PATENT DOCUMENTS

| | | | | |
|---|---|---|---|---|
| FR | 2324401 | * | 4/1977 | ............. B23Q 11/00 |
| FR | 2 441 455 | | 6/1980 | |
| FR | 2441455 | * | 6/1980 | ............. B23Q 11/00 |
| GB | 571610 | | 8/1945 | |
| GB | 1 334 366 | | 10/1973 | |
| JP | A-09-174317 | | 7/1997 | |

(Continued)

OTHER PUBLICATIONS

Aug. 16, 2012 Extended European Search Report issued in European Patent Application No. 12175360.2.
European Search Report issued in Application No. EP 10 168 974.3; dated Sep. 17, 2010.

(Continued)

*Primary Examiner* — Daniel Howell
*Assistant Examiner* — Chwen-Wei Su
(74) *Attorney, Agent, or Firm* — Oliff PLC

(57) ABSTRACT

A technique for allowing a user to operate an operating member disposed in a front end region of a power tool in the state in which a dust collecting attachment designed to be attached to the front end region of the power tool is left attached to the power tool. The dust collecting attachment is used on a power tool having an operating member for removal and/or bit angle setting of a tool bit coupled to a front end region of a tool body. The dust collecting attachment has a dust collecting member which can be attached to the front end region of the tool body. The dust collecting member has an opening formed in a region which faces the operating member in the state in which the dust collecting member is attached to the tool body, and the operating member can be operated by user's finger through the opening.

13 Claims, 12 Drawing Sheets

(56) References Cited

FOREIGN PATENT DOCUMENTS

| JP | A-11-58111 | 3/1999 |
| JP | B2-3726437 | 12/2005 |

OTHER PUBLICATIONS

Dec. 25, 2013 Office Action issued in Japanese Patent Application No. 2009-163980.

* cited by examiner

DUST COLLECTING ATTACHMENT

BACKGROUND OF THE INVENTION

1. Field of the Invention

The invention relates to a dust collecting attachment for collecting dust generated during an operation of a power tool.

2. Description of the Related Art

Japanese patent publication No. 3726437 discloses a dust collecting attachment. This known dust collecting attachment is used on a hammer in which a hammer bit linearly moves in the axial direction and rotates in the circumferential direction of the tool bit. The known dust collecting attachment includes a dust collecting cup for collecting dust generated during drilling operation on concrete. The dust collecting cup has an extensible, cylindrical shape. The dust collecting cup is disposed in such a manner as to surround a front end region of the tool body around its longitudinal axis, and one end of the dust collecting cup in the longitudinal direction is detachably mounted to a side grip of the hammer drill.

An operation sleeve for operating a bit mounting chuck is placed on the front end region of the tool body. The known dust collecting cup is configured to surround the entire front end region of the tool body including the operation sleeve. Therefore, the user has to take the trouble to remove the dust collecting cup from the tool body before each operation of the operation sleeve. In this respect, further improvement is desired.

SUMMARY OF THE INVENTION

Accordingly, it is an object of the invention to improve a usability of a dust collecting attachment for a power tool.

Above described object can be achieved by the claimed invention. According to the invention, a representative dust collecting attachment is provided which is used on a power tool having an operating member for removal and/or bit angle adjustment of a tool bit coupled to a front end region of a tool body. The dust collecting attachment has a dust collecting member which can be attached to the front end region of the tool body including the operating member in such a manner as to surround the front end region around its longitudinal axis. The dust collecting member has an opening formed in a region which faces the operating member in the state in which the dust collecting member is attached to the tool body, and the operating member can be operated by user's finger through the opening.

The "operating member" in the invention typically represents a member which is operated to release the tool bit from bit holding by the tool holding device in order to remove the tool bit held by the tool holding device, and/or, a member which is operated to adjust an angle of the tool bit held by the tool holding device to a predetermined angle when the power tool is used in hammer mode in which the tool bit linearly moves in the longitudinal direction.

Further, typically, the "opening" in the invention suitably includes a window-like opening, for example, of a rectangular shape, and a partly cut opening, for example, of a U-shape, which are formed at two diametrically opposed positions in the dust collecting member. The mariner of mounting the dust collecting member to the power tool suitably includes both the manner of mounting it directly to the tool body and the manner of mounting it indirectly to the tool body via a side grip (auxiliary handle).

The dust collecting member according to the invention has an opening formed in a region which faces the operating member for removal and/or bit angle adjustment of a tool bit in the state in which the dust collecting member is attached to the tool body, and the operating member can be operated by user's finger through the opening. Therefore, the user can operate the operating member through the opening by the finger in the state in which the dust collecting member is left attached to the power tool. Thus, the workability in removal and/or bit angle adjustment of the tool bit can be improved. Further, with the construction in which the operating member can be operated through the opening of the dust collecting member, the number of parts can be reduced compared, for example, with a construction in which an additional operating part is further provided in the dust collecting member to operate the operating member. Therefore, a simply-structured and lower-cost dust collecting attachment is provided. Further, if a sealing member is provided within the dust collecting member in order to fill a clearance between an outer circumferential surface of the tool bit and an inner circumferential surface of the cup, the sealing member can be easily replaced through the opening.

According to another aspect of the invention, the dust collecting member may preferably have a hose connecting port to which a connecting hose for connecting the dust collecting member to a dust collector can be attached. With such a construction, the connecting hose is attached to the hose connecting port and dust generated during operation can be sucked and collected by the dust collector, so that the operation can be continuously performed.

According to a further aspect of the invention, the dust collecting member may preferably have a cap which is used to close the hose connecting port when the connecting hose is not connected to the hose connecting port. With such a construction, the cap is mounted to the hose connecting port and thus, the cap can be used, for example, as the dust collecting member that receives (catches) dust generated during an operation in which the tool bit is oriented upward.

According to a further aspect of the invention, the dust collecting member can be attached to the power tool at more than one position in the circumferential direction, and in the attached state, the dust collecting member is prevented from moving in the circumferential direction. According to the invention, the position (orientation) of the hose connecting port can be changed by changing the mounting position of the dust collecting member in the circumferential direction of the power tool. Therefore, in a usage pattern, for example, in which an auxiliary handle is attached to the power tool and dust is collected by using a dust collector, the user can arbitrarily change the position of the hose connecting port according to the mounting position of the auxiliary handle (whether the grip is oriented downward or laterally) such that the connecting hose can be prevented from getting in the way of holding the side grip.

Further, in the state in which the dust collecting member is attached to the power tool, the dust collecting member is prevented from moving in the circumferential direction. Therefore, during operation of the tool bit in an operation mode involving at least rotation, the dust collecting member can be prevented from rotating together with the tool bit when dust (concrete pieces) is caught between the tool bit and the dust collecting member within the dust collecting member.

According to a further aspect of the invention, the dust collecting member can be attached to the tool body of the power tool. With such a construction, unlike a type in which the dust collecting member is mounted to the auxiliary handle, the dust collecting member can be used irrespective of the presence or absence of the auxiliary handle.

Further, according to a further aspect of the invention, a power tool is provided which has the dust collecting attachment as defined in any one of claims 1 to 6. Thus, the power tool can be provided, having the dust collecting attachment which is effective in improving the workability in removal and/or bit angle adjustment of the tool bit.

According to the invention, a technique is provided for allowing a user to operate an operating member disposed on a front end region of a power tool in the state in which a dust collecting attachment designed to be attached to the front end region of the power tool is left attached to the power tool. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved dust collecting attachments and method for using such dust collecting attachments and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

(First Embodiment)

Figure 1:
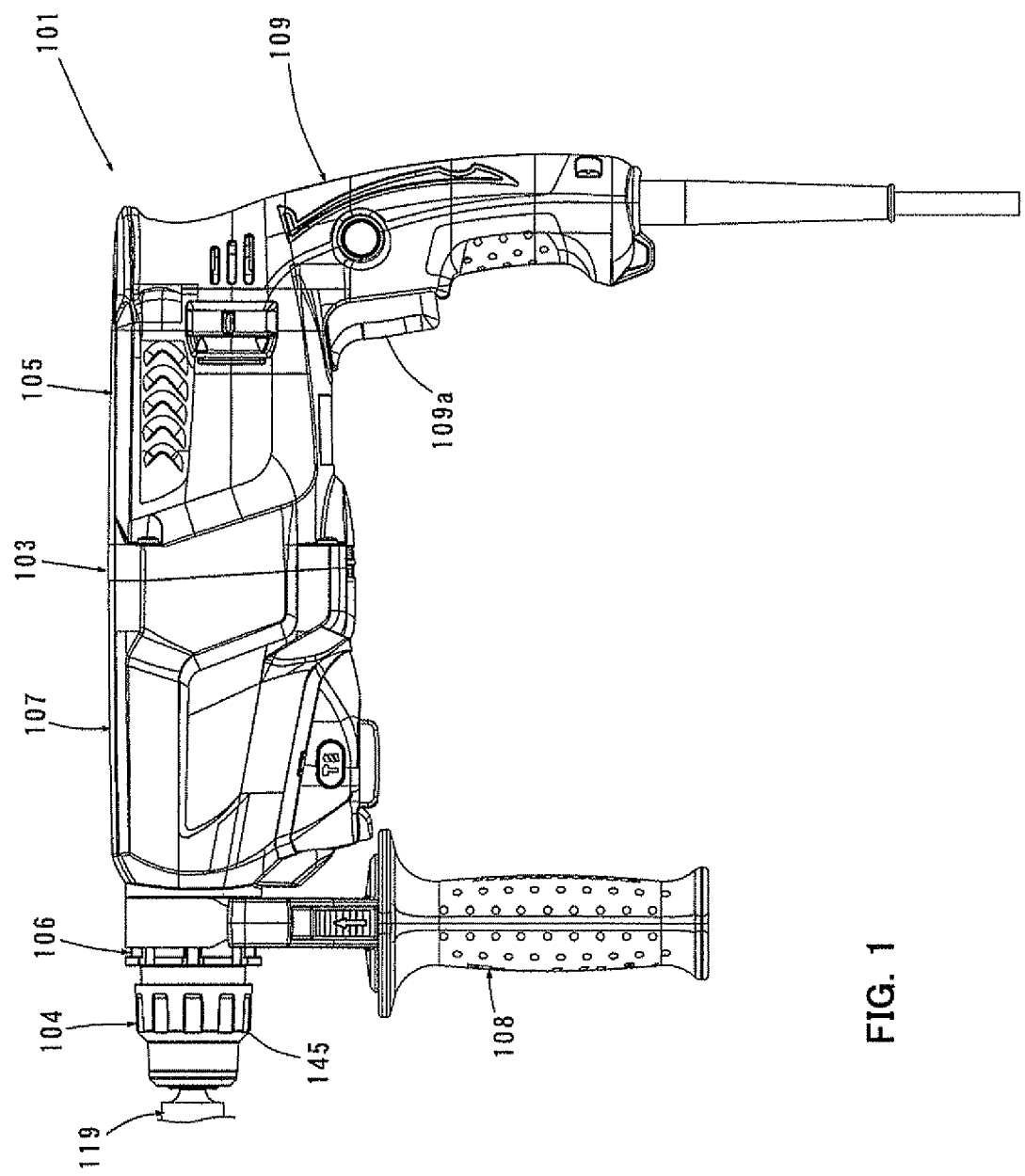
FIG. 1 is an external view showing an entire structure of a hammer drill according to a first embodiment of the invention.
Figure 2:
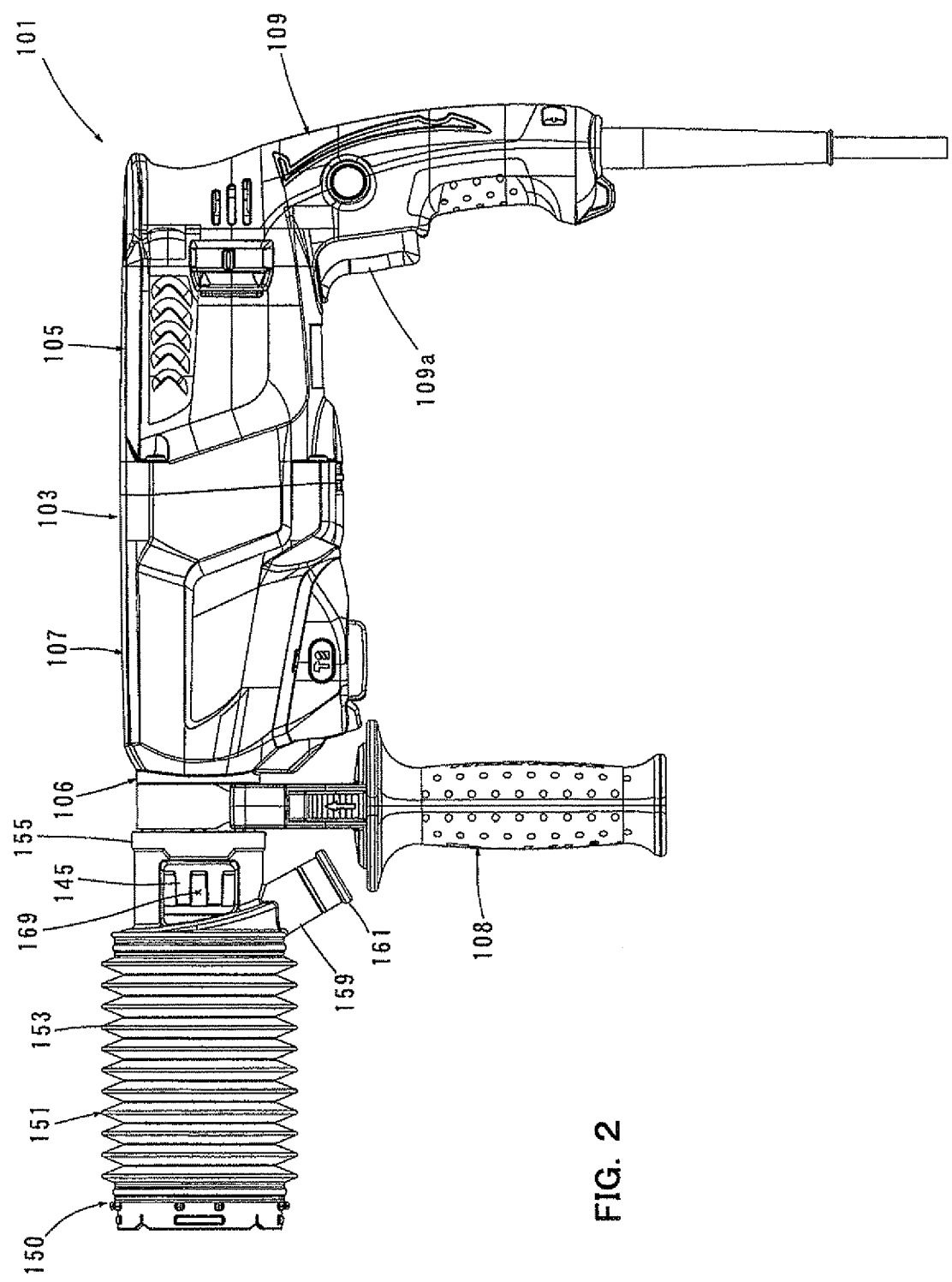
FIG. 2 is an external view showing the hammer drill with a dust collecting attachment attached to a front end region of the hammer drill.
Figure 3:
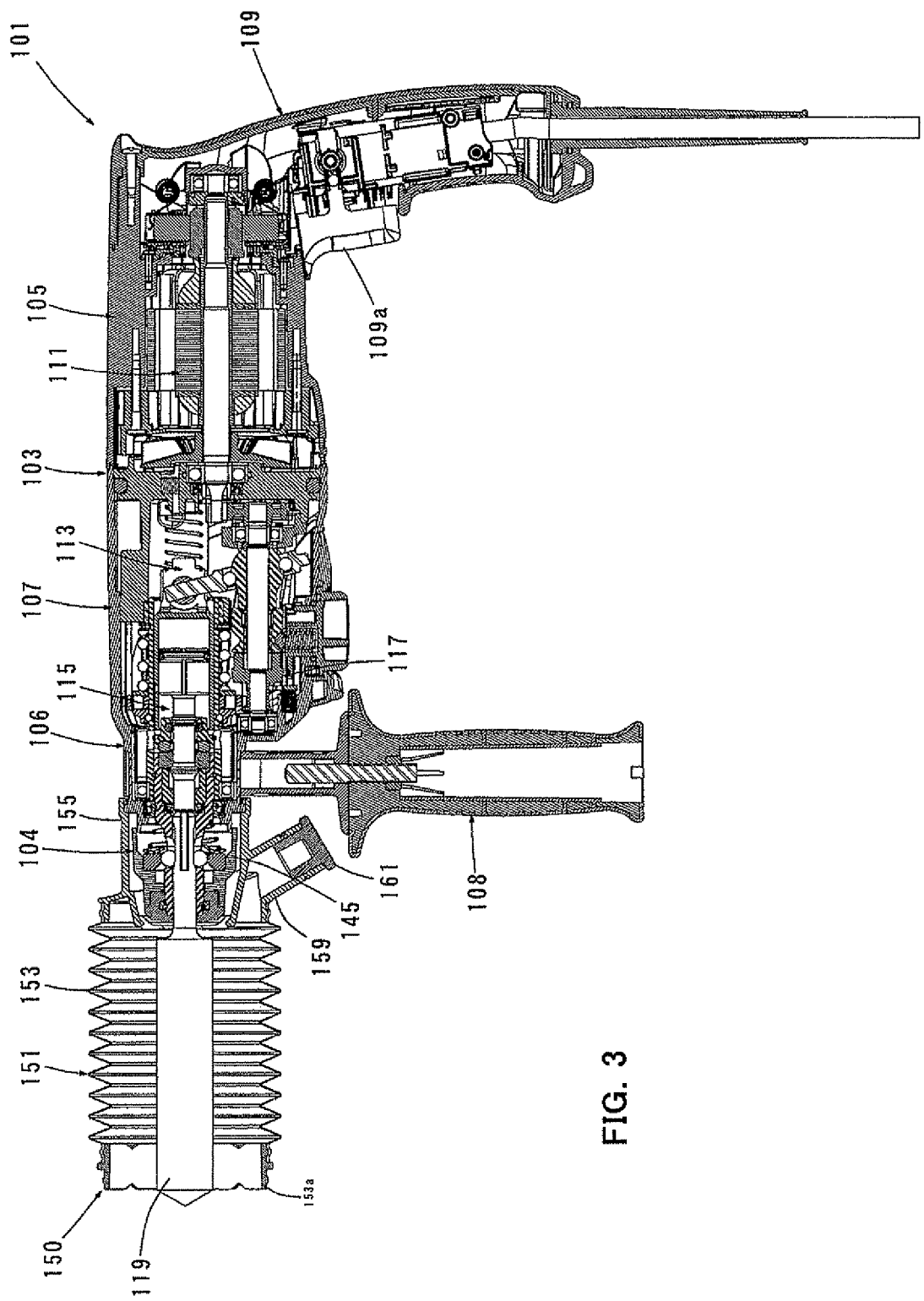
FIG. 3 is a sectional view showing an internal mechanism related to movement of the hammer drill.

A first embodiment of the invention is now described with reference to FIGS. 1 to 7. In this embodiment, a dust collecting attachment is used on an electric hammer drill which is a representative example of a power tool. As shown in FIGS. 1 to 3, a hammer drill 101 according to this embodiment mainly includes a body 103 that forms an outer shell of the hammer drill 101, a hammer bit 119 detachably coupled to a tip end region (front end portion) of the body 103 via a tool holding device 104 and a handgrip 109 that is designed as a main handle and disposed on a rear end portion of the body 103 opposite from the hammer bit 119. The hammer bit 119 is held by the tool holding device 104 such that it is allowed to move with respect to the tool holding device 104 in its axial direction and prevented from rotating with respect to the tool holding device in its circumferential direction. The body 103 and the hammer bit 119 are features that correspond to the "tool body" and the "tool bit", respectively, according to the invention. For the sake of convenience of explanation, the side of the hammer bit 119 is taken as the front and the side of the handgrip 109 as the rear.

As shown in FIG. 3, the body 103 mainly includes a motor housing 105 that houses a driving motor 111, a gear housing 107 that houses a motion converting mechanism 113, a striking mechanism 115 and a power transmitting mechanism 117. Further, a cylindrical barrel 106 is provided on the front of the gear housing 107 and an auxiliary handle in the form of a side grip 108 is detachably mounted to the barrel 106. The side grip 108 is attached or detached by tightening or loosening a band wrapped around the barrel 106.

The driving motor 111 is disposed such that its axis of rotation extends in parallel to the longitudinal direction of the body 103 (the axial direction of the hammer bit 119). The motion converting mechanism 113 appropriately converts the rotating output of the driving motor 111 into linear motion and transmit it to the striking mechanism 115. Then an impact force is generated in the axial direction of the hammer bit 119 (the horizontal direction as viewed in FIG. 1) via the striking mechanism 115. Further, the speed of the rotating output of the driving motor 111 is appropriately reduced by the power transmitting mechanism 117 and then transmitted to the hammer bit 119, so that the hammer bit 119 is caused to rotate in its circumferential direction. The driving motor 111 is driven when a user depresses a trigger 109a disposed on the handgrip 109. Further, the handgrip 109 is designed as an elongate rod-like member having a free extending end and extending a predetermined length from the rear end of the motor housing 105 in a direction (downward direction) transverse to the longitudinal direction of the motor housing 105 (the axial direction of the hammer bit 119).

Figure 4:
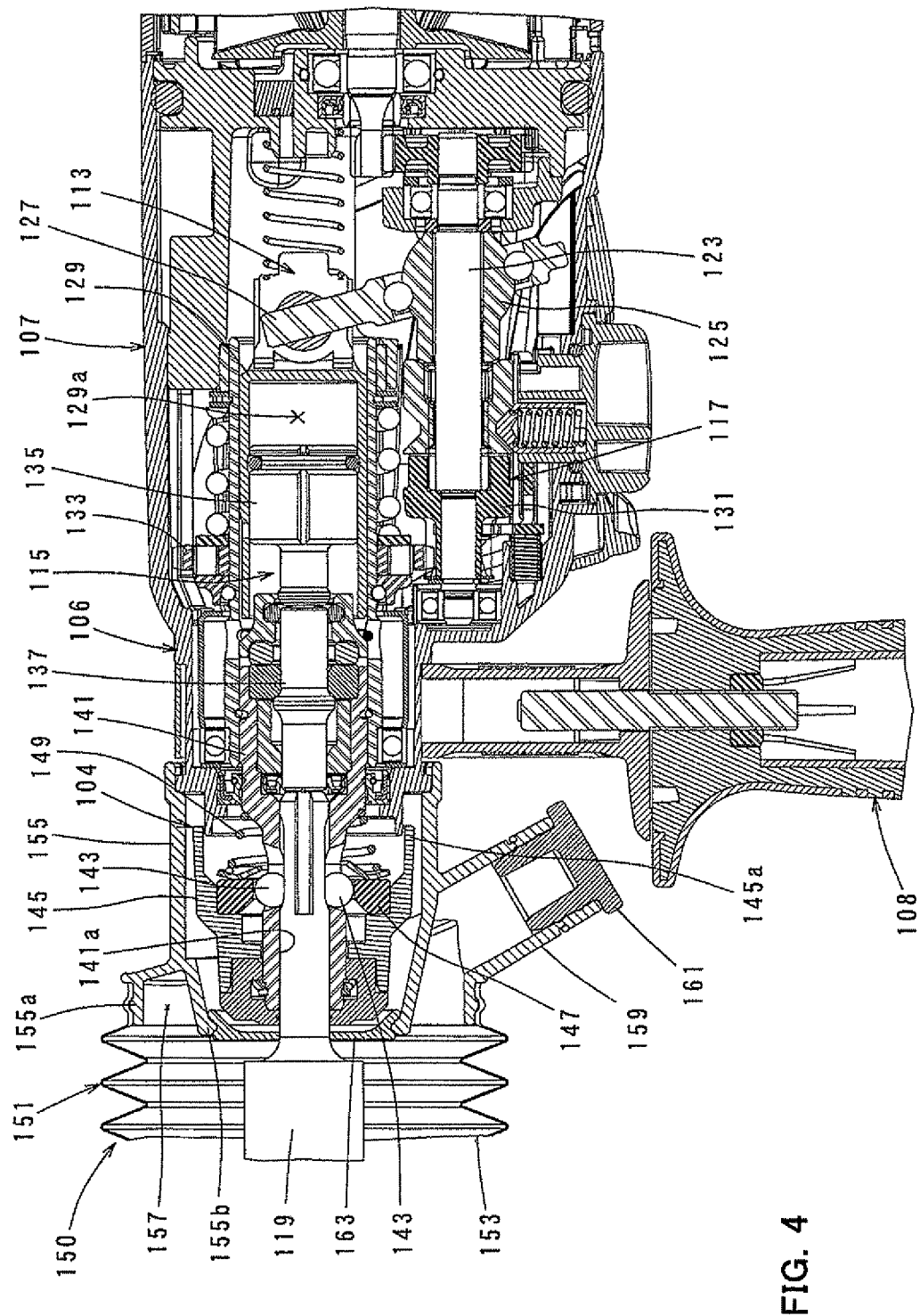
FIG. 4 is a partially enlarged sectional view of FIG. 3.

FIG. 4 is an enlarged view showing an internal mechanism relating to the striking movement and rotation of the hammer bit 119 which includes the motion converting mechanism 113, the striking mechanism 115 and the power transmitting mechanism 117, and the tool holding device 104 for holding the hammer bit 119. The motion converting mechanism 113 mainly includes an intermediate shaft 123 that is rotationally driven by the driving motor 111, a swinging member in the form of a swinging ring 127 that is caused to swing in the axial direction of the hammer bit 119 via a rotating element 125 when the intermediate shaft 123 rotates, and a cylindrical piston 129 that is caused to reciprocate in the axial direction of the hammer bit 119 when the swinging ring 127 swings. Specifically, the motion converting mechanism 113 according to this embodiment is formed by the swinging mechanism utilizing swinging movement of the swinging ring 127. The power transmitting mechanism 117 mainly includes a gear speed reducing mechanism formed by a plurality of gears such as a small-diameter gear 131 that rotates together with the intermediate shaft 123 and a large-diameter gear 133 that engages with the small-diameter gear 131. The power transmitting mechanism 117 serves to transmit the torque of the driving motor 111 to the tool holding device 104. Thus, the tool holding device 104 is caused to rotate in a vertical plane, and then the hammer bit 119 held by the tool holding device 104 rotates. The constructions of the motion converting mechanism 113 and the power transmitting mechanism 117 are known and therefore not described.

The striking mechanism 115 mainly includes a striking element in the form of a striker 135 which is slidably disposed within the cylindrical piston 129, and an intermediate element in the form of an impact bolt 137 which is slidably disposed in the tool holder 141 of the tool holding device 104. The striker 135 is driven via an air spring action (pressure fluctuations) of an air chamber 129a which is caused by sliding movement of the cylindrical piston 129. Then the striker 135 collides with (strikes) the impact bolt 137 and a striking force is transmitted to the hammer bit 119 via the impact bolt 137.

As shown in FIG. 4, the tool holding device 104 mainly includes a cylindrical tool holder 141, a removal preventing member in the form of a plurality of steel balls 143 and a generally cylindrical tool sleeve 145. The tool holder 141 has a bit insert hole 141a having a circular section into which a stem of the hammer bit 119 is removably inserted. The steel balls 143 serve to prevent the hammer bit 119 inserted into the bit insert hole 141a from becoming removed. The tool sleeve 145 can be operated to release the hammer bit 119 from removal prevention of the steel balls 143. The tool sleeve 145 is disposed in front of the barrel 106 of the gear housing 107 such that the user can move the tool sleeve 145 in the axial direction of the hammer bit 119. The tool sleeve 145 is normally biased forward by a biasing spring 149 and holds the steel balls 143 in the removal-prevented position via a stopper ring 147. When the user slides the tool sleeve 145 rearward (toward the handgrip), the hammer bit 119 is released from the removal prevention of the steel balls 143. The tool sleeve 145 is a feature that corresponds to the "operating member for removal of the tool bit" according to the invention. Further, the structures for preventing the hammer bit 119 from becoming removed and releasing it from the removal prevention are known and therefore not described in detail.

In the hammer drill 101 thus constructed, when the driving motor 111 is driven, the rotating output of the driving motor 111 is converted into linear motion via the motion converting mechanism 113 and then transmitted to the hammer bit 119 as linear motion in the axial direction of the hammer bit 119 via the striking mechanism 115. Specifically, the hammer bit 119 is caused to perform a striping movement. Further, in addition to the above-described striking movement, rotation is transmitted to the hammer bit 119 via the power transmitting mechanism 117 which is driven by the rotating output of the driving motor 111, so that the hammer bit 119 is caused to rotate in the circumferential direction. Specifically, the hammer bit 119 performs a hammer drill (drilling) operation on a workpiece (concrete) by striking movement in the axial direction and rotation in the circumferential direction.

Further, the hammer drill 101 can be switched not only to the hammer drill mode in which the hammer bit 119 is caused to perform striking movement in the axial direction and rotation in the circumferential direction as described above, but to the drill mode in which the hammer bit 119 is caused to perform only rotation, or hammer mode in which the hammer bit 119 is caused to perform only striking movement. This mode switching is a known technique and not directly related to the invention, and therefore its description is omitted.

Figure 5:
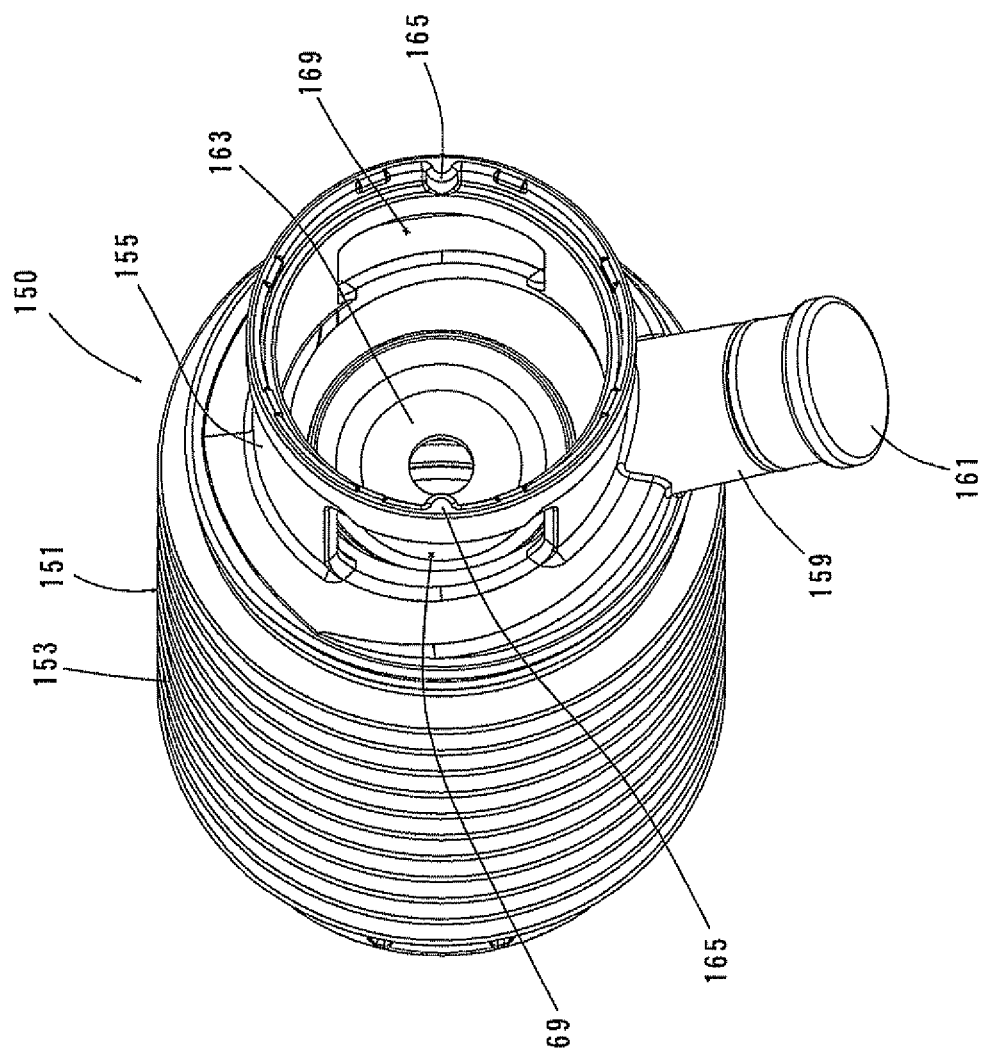
FIG. 5 is a perspective view showing a dust collecting attachment.
Figure 6:
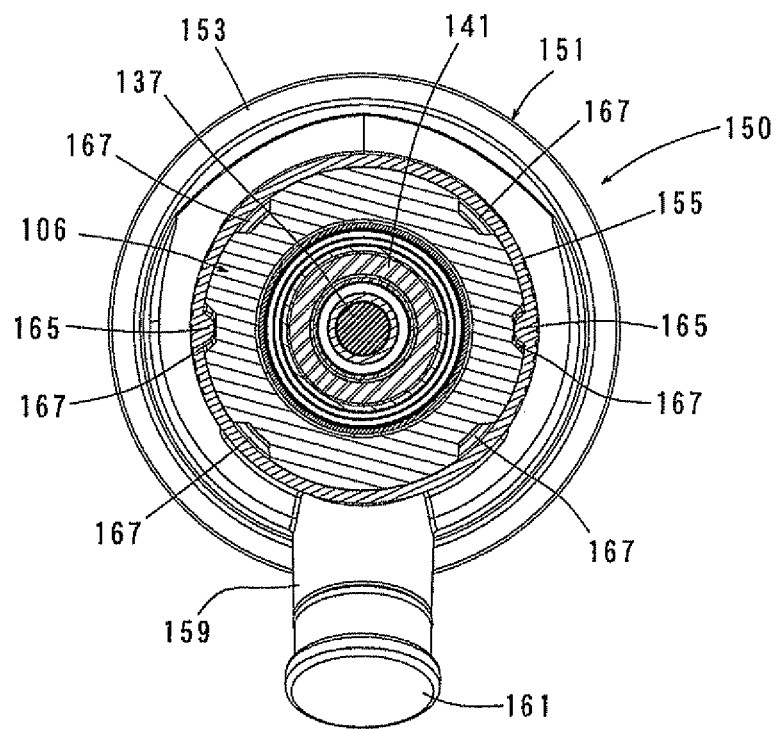
FIG. 6 is a sectional view showing a structure in which a mounting position (orientation) of a dust collecting cup can be changed, in the state in which the dust collecting cup is attached such that a dust discharge nozzle is oriented vertically downward.
Figure 7:
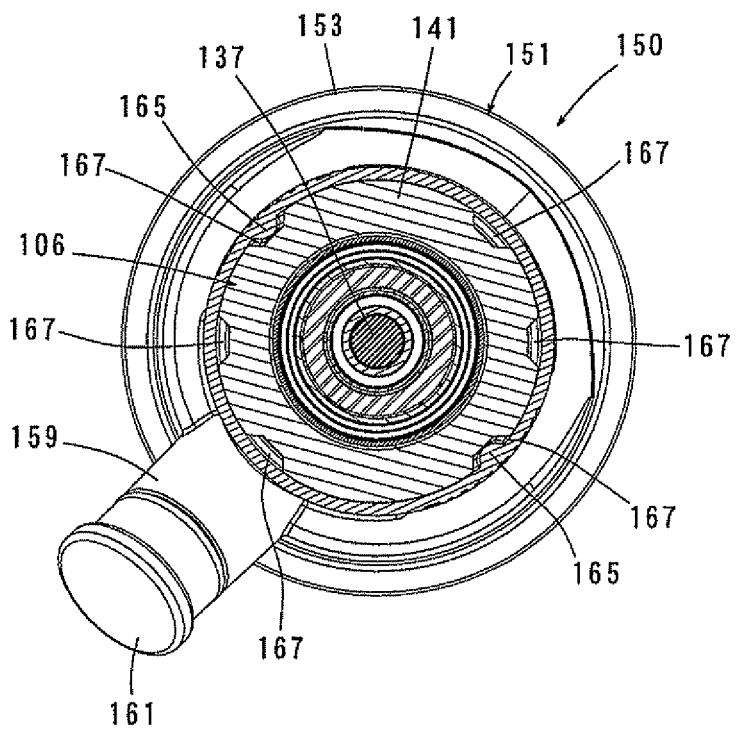
FIG. 7 is a sectional view showing the structure in which the mounting position (orientation) of the dust collecting cup can be changed, in the state in which the dust collecting cup is attached such that the dust discharge nozzle is oriented obliquely downward.

A dust collecting attachment 150 is now explained with reference to FIGS. 4 to 7. The dust collecting attachment 150 is attached to the hammer drill 101 having the above-described construction and serves to collect dust generated during operation on a workpiece (such as concrete). FIG. 5 shows an entire structure of the dust collecting attachment 150 and FIGS. 6 and 7 show the state in which the dust collecting attachment 150 is attached to the body 103.

The dust collecting attachment 150 according to this embodiment mainly includes a cylindrical dust collecting cup 151 having both ends open, and a connecting hose (not shown) for connecting the dust collecting cup 151 to a dust collector. The dust collecting cup 151 is attached to the body 203 so as to cover a tip end region of the body 203 including the hammer bit 219. The dust collecting cup 151 is a feature that corresponds to the "dust collecting member" according to the invention. The dust collecting cup 151 has an extensible bellows cup body 153, and a cylindrical cup mounting portion 155 which is connected to one end (rear end) of the cup body 153 in the longitudinal direction (in the direction of expansion and contraction). When the dust collecting cup 151 is attached to the body 103, the cup body 153 covers the hammer bit 119 and the cup mounting portion 155 covers the tip end region of the body 103 or the tool holding device 104 which holds the hammer bit 119. As shown in FIG. 4, an outer cylindrical portion 155a for connection of the cup body is provided on one end (front end) of the cup mounting portion 155. A rear end of the cup body 153 is fitted onto the outer surface of the outer cylindrical portion 155a, so that the cup body 153 and the cup mounting portion 155 are connected to each other. Further, a non-bellows region 153a is provided in part of a front end region of the cup body 153, so that the cup body 153 can be pressed against the workpiece with higher stability in closer contact.

The cup mounting portion 155 has a dust storage 157 and a dust discharge nozzle 159 for discharging dust from the dust storage 157 to the outside. The dust storage 157 is provided as an annular space surrounded by an inner circumferential surface of the outer cylindrical portion 155a, an outer circumferential surface of an inner cylindrical portion 155b surrounded by the outer cylindrical portion 155a, and an inner surface of a region connecting the cylindrical portions 155a, 155b. Further, the dust storage 157 has an opening on the side facing the inner space of the cup body 153, and an inlet of the dust discharge nozzle 159 communicates with (is open to) the dust storage 157.

The dust discharge nozzle 159 is provided as a hose connecting part to which the connecting hose for connecting the dust collecting cup 151 to a dust collector can be attached. Further, the dust discharge nozzle 159 protrudes radially outward of the cup mounting portion 155 and obliquely rearward. The dust discharge nozzle 159 is a feature that corresponds to the "hose connecting port" according to the invention. Further, the dust collecting cup 151 has a detachable cap 161 which is used to close an outlet of the dust discharge nozzle 159 when the dust collecting cup 151 is used without being connected to a dust collector. The cap 161 is a feature that corresponds to the "stopper" according to the invention. A sealing member 163 is provided in the vicinity of a connection between the cup body 153 and the cup mounting portion 155 and serves to fill a clearance between the cup mounting portion 155 and the stem of the hammer bit 119, so that dust within the cup body 153 is prevented from entering an inner space of the cup mounting portion 155.

As shown in FIGS. 3 and 4, the cup mounting portion 155 of the dust collecting cup 151 is mounted to the barrel 106 such that the opening on its rear end is fitted onto the outer surface of the front end of the barrel 106. As shown in FIGS. 6 and 7, two inwardly protruding engagement protrusions 165 are formed on the inner surface of the opening of the cup mounting portion 155 and with a spacing of 180 degrees therebetween in the circumferential direction. Correspondingly, six engagement recesses 167 are fowled in the outer surface of the front end of the barrel 106 and diametrically opposed in pairs with respect to the axial center line of the barrel 106. Therefore, the two engagement protrusions 165 of the cup mounting portion 155 can be selectively engaged with opposed two of the six engagement recesses 167, so that the dust collecting cup 151 is attached to the barrel 106 in such a manner as to be prevented from moving in the circumferential direction with respect to the barrel 106. Specifically, the dust collecting cup 151 can be mounted to the barrel 106 at more than one position in the circumferential direction, so that the orientation (position) of the dust discharge nozzle 159 can be changed around the central axis of the barrel 106.

Representative examples of orientation of the dust discharge nozzle 159 are shown in FIGS. 6 and 7. In FIG. 6, the dust discharge nozzle 159 is shown oriented vertically downward, and in FIG. 7, the dust discharge nozzle 159 is shown oriented obliquely downward left as viewed from the rear of the hammer drill 101. Further, each of the engagement recesses 167 has a generally trapezoidal section, and the engagement protrusions 165 are engaged with the engagement recesses 167 by elastic deformation of the engagement protrusions 165. In the attached state, the dust collecting cup 151 is prevented from moving in the circumferential direction with respect to the barrel 106.

Further, two generally rectangular access holes 169 for removal of the tool bit are formed in a region of the cup mounting portion 155 of the dust collecting cup 151 which faces a rear end portion of the tool sleeve 145 of the tool holding device 104 or a knob 145a when the dust collecting cup 151 is attached to the barrel 106. Thus the tool sleeve 145 can be operated by user's fingers through the access holes 169 (see FIG. 5). Two access holes 169 are spaced 180 degrees apart from each other in the circumferential direction of the cup mounting portion 155, or disposed in opposed regions (right and left regions as viewed from the rear of the hammer drill 101) of the cup mounting portion 155 with respect to the axial center line. Therefore, the knob 145a of the tool sleeve 145 is exposed to the outside through the access holes 169 (see FIG. 2), so that the user can hold and operate the tool sleeve 145 from the radial directions by the fingers through the two access holes 169. The access hole 169 is a feature that corresponds to the "opening" according to the invention.

The dust collecting attachment 150 constructed as described above is attached to the front end region of the body 103 and used to collect dust generated during operation (drilling operation) by the dust collecting cup 151. In the dust collecting attachment 150 according to this embodiment, the two access holes 169 for removal of the tool bit are formed in the cup mounting portion 155 of the dust collecting cup 151 and opposed to each other with respect to the axial center line of the cup mounting portion 155, so that the user can operate the tool sleeve 145 of the tool holding device 104 through the access holes 169. Therefore, in the state in which the dust collecting attachment 150 is left attached to the body 103, the user can hold the knob 145a of the tool sleeve 145 by the fingers through the two access holes 169 and move it rearward. As a result, the hammer bit 119 can be released from removal prevention of the steel balls 143, so that the hammer bit 119 can be removed from the tool holding device 104. Specifically, the hammer bit 119 can be removed with the dust collecting attachment 150 left attached to the body 103, so that workability can be enhanced.

Further, according to this embodiment having a construction in which the tool sleeve 145 is operated through the access holes 169, compared, for example, with a construction in which another operating part for operating the tool sleeve is additionally provided on the dust collecting cup, the number of parts can be reduced, and the dust collecting attachment is provided in a simpler structure at lower cost. When the sealing member 163 disposed inside the dust collecting cup 151 needs replacement due to its deterioration, replacement of the sealing member 163 is done with the dust collecting attachment 150 removed from the body 103. In this case, the access holes 169 are located closer to the sealing member 163 than a bore opening of the cup mounting portion 155, so that the sealing member 163 can be easily replaced through the access holes 169. Thus, ease of replacement of the sealing member 163 can be enhanced.

Further, according to this embodiment, the dust discharge nozzle 159 is provided to discharge dust from the cup body 153 to the outside, and a connecting hose for connecting the cup body 153 to a dust collector can be attached to the dust discharge nozzle 159, so that dust generated during operation can be sucked and collected by the dust collector. Therefore, it is not necessary to interrupt the operation in order to dispose of the dust accumulated within the cup body 153, so that operating efficiency can be enhanced. In the state in which the cap 161 is mounted to the dust discharge nozzle 159, the dust collecting attachment 150 can be used as a dust collecting cup for receiving (catching) dust generated during an operation, such as drilling a ceiling, in which the hammer drill is oriented upward. Specifically, the dust collecting attachment 150 can be used in either way according to the operation pattern.

Further, in this embodiment, the dust collecting attachment 150 is mounted to the barrel 106 of the hammer drill 101. In a construction in which the dust collecting attachment 150 is attached, for example, to the side grip 108, the dust collecting attachment 150 can not be used on a hammer drill having no side grip. However, according to this embodiment, the dust collecting attachment 150 is directly mounted to the body 103, so that it can be used on a hammer drill, regardless of the presence or absence of a side grip.

Further, according to this embodiment, when the dust collecting cup 151 is mounted to the barrel 106, the protruding direction of the dust discharge nozzle 159 can be changed around the axial center line of the barrel 106. Therefore, in a usage pattern in which dust is forcibly collected by using a dust collector, the user can change the position of the dust collecting cup 151 according to the mounted state of the side grip 108 (whether the side grip 108 is oriented vertically downward or laterally from the barrel 106), so that interference between the side grip 108 and the connecting hose can be rationally avoided. Further, the connecting hose can be prevented from interfering with the operation according to surrounding circumstances during the operation. Thus, the convenience of the hammer drill can be improved.

Further, in the state in which the dust collecting cup 151 is attached to the barrel 106, the dust collecting cup 151 is prevented from moving in the circumferential direction by engagement of the engagement protrusions 165 with the engagement recesses 167 of the barrel 106. Therefore, the dust collecting cup 151 can be prevented from rotating together with the hammer bit 119 when dust (concrete pieces) is caught between the hammer bit 119 and the dust collecting cup 151 during drilling operation.

In the hammer drill 101 which can be switched to the hammer mode in which the hammer bit 119 is caused to perform only a striking movement, a bit angle setting mechanism (a variolock mechanism) is provided which serves to prevent rotation of the hammer bit 119 (to forcibly lock the tool holder 141 of the tool holding device 104 to the gear housing 107) in order to keep the angle of the hammer bit 119 constant (to prevent the hammer bit 119 from moving in the circumferential direction) during operation in hammer mode. The angle setting mechanism of the hammer bit 119 is configured such that the hammer bit 119 is released from the rotation prevention halfway through the operation of switching the operation mode of the hammer bit 119, for example, from hammer drill mode to hammer mode, by an operation mode switching lever, and when the switching operation to hammer mode is completed, the hammer bit 119 is again prevented from rotating. Therefore, the angle setting of the hammer bit 119 can be made by turning the tool sleeve 145 of the tool holding device 104 in the circumferential direction by the user's fingers in the halfway region of the switching movement in which the hammer bit 119 is not prevented from rotating by the bit angle setting mechanism. Specifically, with the dust collecting attachment 150 according to this embodiment, the angle setting of the hammer bit 119 can be made through the bit removal access holes 169 with the dust collecting attachment 150 left attached to the body 103.

(Second Embodiment)

Figure 8:
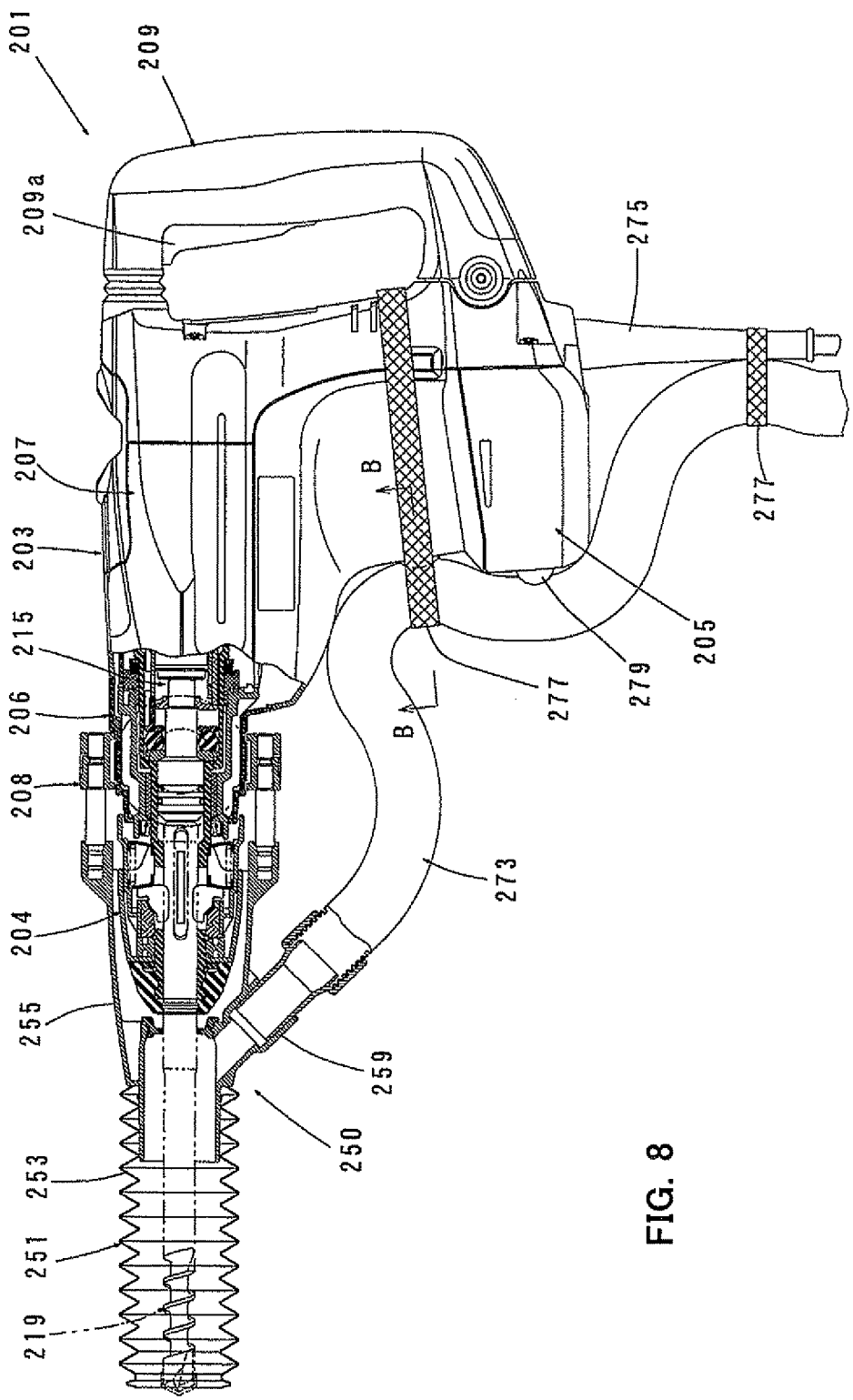
FIG. 8 is a partially sectional view showing an entire structure of a hammer drill with a dust collecting attachment attached thereto according to a second embodiment of the invention.

A second embodiment of the invention is now explained in detail with reference to FIGS. 8 to 13. In this embodiment, a dust collecting attachment 250 is used on an electric hammer drill 201 of the type in which the rotation axis of the driving motor extends in a direction transverse to the axial direction of the hammer bit 219 (in the vertical direction). As shown in FIG. 8, the hammer drill 201 according to this embodiment mainly includes a body 203 that forms an outer shell of the hammer drill 201, a hammer bit 219 detachably coupled to a tip end region (front end portion) of the body 203 via a tool holding device 204 and a handgrip 209 that is designed as a main handle and disposed on a side (rear end portion) of the body 203 opposite from the hammer bit 219. The hammer bit 219 is held by the tool holding device 204 such that it is allowed to move with respect to the tool holding device 204 in its axial direction and prevented from rotating with respect to the tool holding device 204 in its circumferential direction. The body 203 and the hammer bit 219 are features that correspond to the "tool body" and the "tool bit", respectively, according to the invention.

The body 203 mainly includes a motor housing 205 that houses a driving motor (not shown), and a gear housing 207 that houses an internal mechanism related to striking movement and rotation of the hammer bit 219. In this embodiment, the driving motor is disposed such that its rotation axis extends in a direction transverse to the axial direction of the hammer bit 219. Therefore, as shown in FIG. 8, the body 203 has a generally L-shaped body structure formed by the motor housing 205 and the gear housing 207. Further, the handgrip 209 disposed on the rear end of the body 203 is configured as a generally D-shaped handle extending in the vertical direction transverse to the axial direction of the hammer bit 219 and having upper and lower ends connected to the body 203. A cylindrical barrel 206 is provided on the front of the gear housing 207 and the auxiliary handle in the form of the side grip 208 is detachably attached to the barrel 206. Attachment of the side grip 208 is described below.

Further, the internal mechanism mainly includes a crank mechanism (not shown) as a motion converting mechanism, a striking mechanism 215 and a power transmitting mechanism (not shown). The crank mechanism converts the rotating output of the driving motor into linear motion. The striking mechanism 215 linearly moves in the longitudinal direction of the body 203 via components of linear motion of the crank mechanism and thereby strikes the hammer bit 219. The power transmitting mechanism appropriately reduces the speed of the rotating output of the driving motor and transmits it to the hammer bit 219 and thereby causes the hammer bit 219 to rotate in the circumferential direction. The striking mechanism 215 mainly includes a striking element in the form of a striker 235 that linearly moves, and an intermediate element in the form of an impact bolt 237 that transmits the striking force of the striker 235 to the hammer bit 219. Further, a specific structure of causing the hammer bit 219 to perform the striking movement and rotation via the internal mechanism is known and therefore it is not described in further detail.

Figure 9:
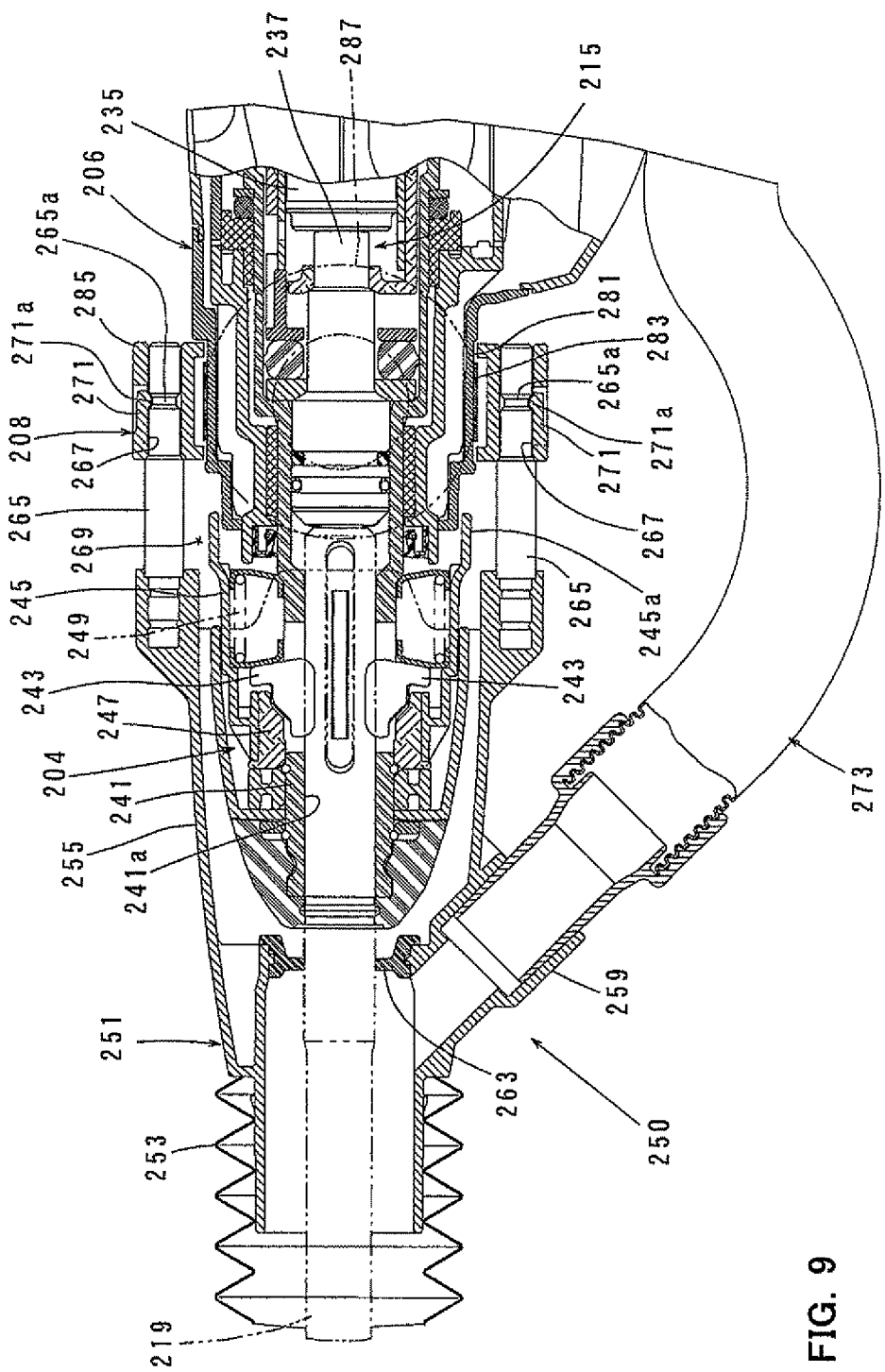
FIG. 9 is an enlarged view showing part (the dust collecting attachment side) of FIG. 8.

As shown in FIG. 9, the tool holding device 204 mainly includes a cylindrical tool holder 241 with a bit insert hole 241a having a circular section into which the stem of the hammer bit 219 is removably inserted, a removal preventing member in the form of a plurality of engagement claws 243 which prevent removal of the hammer bit 219 inserted into the bit insert hole 241a, and a generally cylindrical tool sleeve 245 that can be operated to release the hammer bit 219 from removal prevention of the engagement claws 243. The tool sleeve 245 is disposed in front of the barrel 206 of the gear housing 207 such that it can be moved by the user in the axial direction of the hammer bit 219. The tool sleeve 245 is normally biased forward by a biasing spring 249 and retains the engagement claws 243 in the removal preventing position via a stopper ring 247. The bit removal prevention of the engagement claws 243 is released when the tool sleeve 245 is slid rearward (toward the handgrip). The tool sleeve 245 is a feature that corresponds to the "operation member for removal of the tool bit" according to the invention. Specifically, the tool holding device 204 has the same construction as the tool holding device 104 in the first embodiment, except that the engagement claws 243 are used in place of the steel balls 143 of the tool holding device 104 as described in the first embodiment.

In the hammer drill 201 constructed as described above, when the driving motor is driven by depressing a trigger 209a, the rotating output of the driving motor is converted into linear motion via the motion converting mechanism and then transmitted as linear motion in the axial direction to the hammer bit 219 via the striking mechanism. As a result, the hammer bit 219 is caused to perform striking movement. Further, rotation is transmitted to the tool holding device 204 via the power transmitting mechanism driven by the rotating output of the driving motor, so that the hammer bit 219 held by the tool holding device 204 is caused to rotate in the circumferential direction. Specifically, the hammer bit 219 performs a hammer drill (drilling) operation on a workpiece (concrete) by striking movement in the axial direction and rotation in the circumferential direction.

Like the first embodiment, the hammer drill 201 can be switched not only to the hammer drill mode in which the hammer bit 219 is caused to perform striking movement in the axial direction and rotation in the circumferential direction as described above, but to drill mode in which the hammer bit 219 is caused to perform only rotation, or hammer mode in which the hammer bit 219 is caused to perform only striking movement. This mode switching is a known technique and not directly related to the invention, and therefore its description is omitted.

Figure 10:
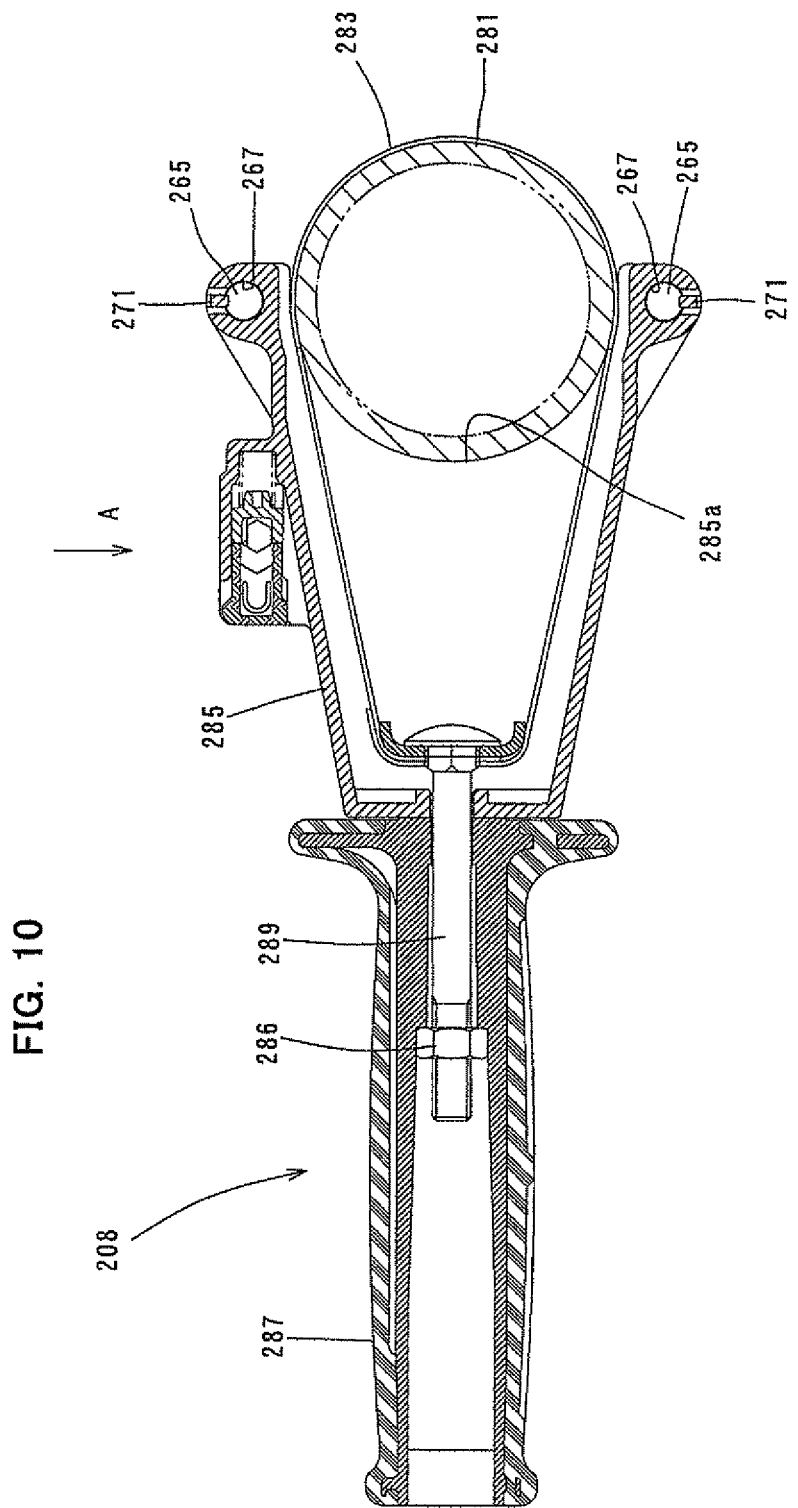
FIG. 10 is a sectional view showing a side grip to which the dust collecting attachment is attached.

The dust collecting attachment 250 according to this embodiment is mounted to the side grip 208. Therefore, the side grip 208 is described before explanation of the dust collecting attachment 250. The side grip 208 is mounted to the barrel 206. To this end, a grip mounting portion 281 is formed on the outer surface of the barrel 206 by a circumferential surface having a predetermined width and extending parallel to the longitudinal direction of the body 203. As shown in FIG. 10, the side grip 208 is configured as a rod-like member extending in a direction transverse to the axial direction of the hammer bit 219 as a whole.

As shown in FIG. 10, the side grip 208 mainly includes a band 283 wrapped around the outer surface of the grip mounting portion 281 of the barrel 206, a base 285 having a generally U-shaped engagement surface 285a which is disposed on the end of the band 283 and engaged with the outer surface of the grip mounting portion 281, a grip 287 which is connected to the base 285 and can rotate around its longitudinal axis, and a threaded operation rod 289 for tightening the band 283. The operation rod 289 is loosely inserted through the central portions of the grip 287 and the base 285 and extends in the longitudinal direction of the grip. One end of the operation rod 289 is connected to the end of the band 283 and the other end is threadably engaged with a nut 286 disposed within the grip 287. The nut 286 is prevented from rotating with respect to the grip 287. Therefore, by rotating the grip 287 clockwise or counterclockwise around its longitudinal axis, the threaded operation rod 289 threadably engaged with the nut 286 is moved forward or rearward in the longitudinal direction, so that the band 283 can be tightened or loosened. The side grip 208 is fixed to the grip mounting portion 281 by tightening the band 283. In this embodiment, the side grip 208 is mounted to the body 203 and protrudes substantially horizontally in a lateral direction of the body 203.

The dust collecting attachment 250 is now explained. In the above-described first embodiment, the dust collecting attachment 150 is mounted to the barrel 106, but, in the dust collecting attachment 250 according to this embodiment, the dust collecting cup 251 is mounted to the side grip 208. In the other points, the dust collecting attachment 250 has the same basic structure as the dust collecting attachment 150 of the first embodiment. As shown in FIG. 9, the dust collecting attachment 250 mainly includes a dust collecting cup 251 which has a cylindrical shape having both ends open and covers the front end region of the body 203, and a connecting hose 273 which connects the dust collecting cup 251 to a dust collector. The dust collecting cup 251 is a feature that corresponds to the "dust collecting member" according to the invention. The dust collecting cup 251 includes an extensible bellows cup body 253, and a cylindrical cup mounting portion 255 which is connected to the rear end of the cup body 253. Further, a dust discharge nozzle 259 and a sealing member 263 are provided on the cup mounting portion 255 in its region of connection with the cup body 253. The dust discharge nozzle 259 is open to the internal space of the cup mounting portion 255, and the sealing member 263 serves to fill a clearance between the cup mounting portion 255 and the stem of the hammer bit 219. The dust discharge nozzle 259 is a feature that corresponds to the "hose connecting port" according to the invention.

Figure 12:
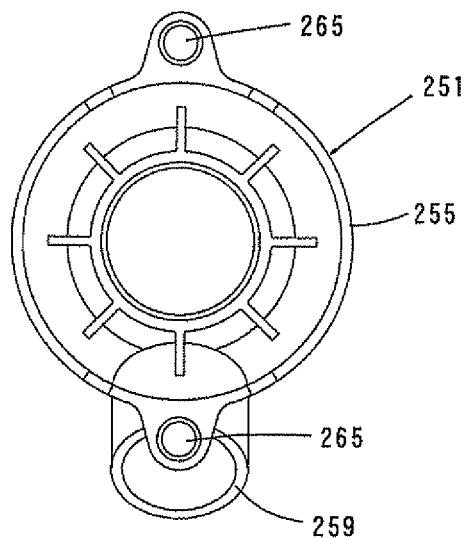
FIG. 12 is a view showing the dust collecting attachment from the rear of the hammer drill (from the right side as viewed in FIG. 8).

As shown in FIG. 12, two poles 265 having a circular section are provided on the rear end of the cup mounting portion 255 (on the body 203 side) in order to mount the cup mounting portion 255 to the side grip 208. The poles 265 extend rearward in parallel to each other and are spaced 180 degrees apart from each other in the circumferential direction. Correspondingly, as shown in FIG. 10, two engagement holes 267 which face the cup mounting portion 255 are formed in the base 285 of the side grip 208. As shown in FIG. 9, an end (rear end) of each of the poles 265 is inserted into the associated engagement hole 267, so that the cup mounting portion 255 is mounted to the base 285 of the side grip 208 in such a manner as to face the base 285 with a predetermined spacing in the axial direction of the hammer bit 219.

In this embodiment, by provision of the two poles 265 protruding rearward from the cup mounting portion 255, two generally U-shaped spaces surrounded by the rear surface of the cup mounting portion 255 and the two poles 265 and having an open rear end are defined at the rear of the cup mounting portion 255. When the cup mounting portion 255 is mounted to the side grip 208 with a predetermined spacing in the axial direction of the hammer bit 219 via the poles 265, two access spaces 269 are defined by the rear surface of the cup mounting portion 255, the front surface of the base 285 and the two poles 265 between the base 285 of the side grip 208 and the cup mounting portion 255. Thus, the user can operate the tool sleeve 245 of the tool holding device 204 by the fingers through the access spaces 269. The access space 269 is a feature that corresponds to the "opening" according to the invention. Further, the length of the access space 269 in the longitudinal direction can be appropriately set by changing the length of the poles 265.

Figure 11:
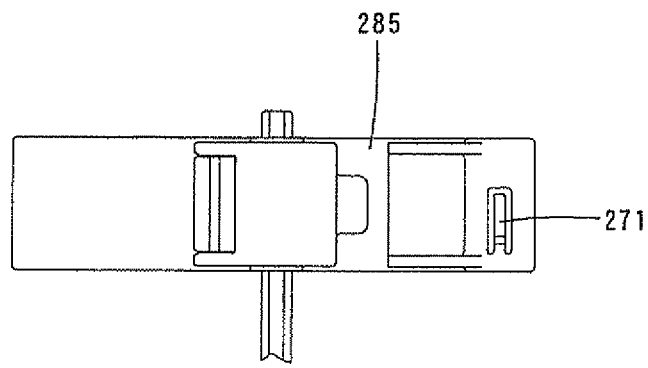
FIG. 11 is a view as viewed from the direction shown by the arrow A in FIG. 10.

As shown in FIGS. 9 to 11, an engagement member 271 is provided on the base 285 of the side grip 208 and has a generally semicircular engagement protrusion 271a which protrudes radially inward into the engagement hole 267. When the pole 265 of the dust collecting cup 251 is inserted into the associated engagement hole 267, the engagement member 271 is elastically engaged with an annular engagement groove 265a formed in the outer circumferential surface of the pole 265 and thereby retains the pole 265 in the inserted position. Thus, the engagement member 271 is provided as a pole retaining member. When the pole 265 is pulled forward, the engagement member 271 is elastically deformed radially outward, so that the engagement protrusion 271a is disengaged from the engagement groove 265a. Thus, the pole 265 can be removed from the engagement hole 267.

A connecting hose 273 for connecting the dust discharge nozzle 259 to a dust collector can be connected to the dust discharge nozzle 259. As shown in FIG. 8, the connecting hose 273 connected to the dust discharge nozzle 259 extends from the dust discharge nozzle 259 to the body 203 or to the front of the motor housing 205 and extends downward along the front surface of the motor housing 205. The connecting hose 273 is bound to the motor housing 205 and to a cord guard 275 which extends downward from the motor housing 205 and serves to protect a power cord, with banding bands 277, such that the connecting hose 273 is prevented from hanging down and swinging during operation.

Figure 13:
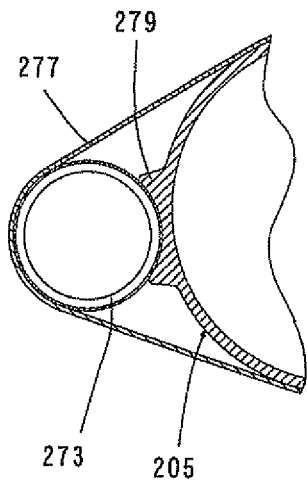
FIG. 13 is a sectional view taken along line B-B in FIG. 8.

Further, a hose holding rib 279 is formed on the front surface of the motor housing 205 and has a concave portion which conforms to an outer circumferential surface of the connecting hose 273. As shown in FIG. 13, the outer surface of the connecting hose 273 is engaged with the concave portion of the hose holding rib 279, so that the movement of the connecting hose 273 bound with the banding bands 277 is further prevented. Thus, the stability of the connecting hose 273 is further improved.

The dust collecting attachment 250 constructed as described above is attached to the side grip 208 via the poles 265. At this time, in this embodiment, as shown in FIGS. 8 and 9, the protruding direction of the dust discharge nozzle 259 of the dust collecting cup 251 has a phase difference of about 90 degrees in the circumferential direction with respect to the protruding direction of the side grip 208 attached to the body 203. With this construction, even though the dust collecting cup 251 is attached to the side grip 208, the connecting hose 273 connected to the dust discharge nozzle 259 can be prevented from interfering with the user's hand holding the side grip 208. Further, by fixing the connecting hose 273 along the body 203 by the banding band 277, the connecting hose 273 can be prevented from hanging down and swinging. Therefore, when the user holds the side grip 208 and performs an operation, the connecting hose 273 is prevented from interfering with the operation, so that the workability can be improved. Further, when the power tool is used without connecting the dust collecting cup 251 to a dust collector, like the first embodiment, the dust discharge nozzle 259 can be closed by a cap.

In this embodiment, the dust collecting cup 251 is mounted to the side grip 208 via the two poles 265 such that the dust collecting cup 251 and the side grip 208 are opposed to each other with a predetermined spacing in the longitudinal direction. At this time, the two opposed access spaces 269 are defined by the two poles 265 between the dust collecting cup 251 and the side grip 208, so that the user can operate the rear end of the tool sleeve 245 of the tool holding device 204 or a knob 245a by the fingers through the access spaces 269. Therefore, in the state in which the dust collecting attachment 250 is left attached to the body 203, the user can move the tool sleeve 245 of the tool holding device 204 rearward by the fingers through the two access spaces 269. As a result, the hammer bit 219 can be released from removal prevention of the engagement claw 243, so that the hammer bit 219 can be removed from the bit insert hole 241a of the tool holder 241 of the tool holding device 204. Specifically, the hammer bit 219 can be removed with the dust collecting attachment 250 left attached to the body 203.

Further, the tool sleeve 245 is operated not only for removal of the hammer bit 219, but, as described in the first embodiment, for angular positioning and adjustment of the hammer bit 219 when the hammer drill 201 is used for a hammering operation in hammer mode in which the hammer bit 219 is caused to perform only the striking movement.

Further, in this embodiment, the dust collecting cup 251 is attached to the side grip 208, so that the dust collecting attachment 250 can be used on the hammer drill 201 without making a change or modification to the body 203 side of the hammer drill 201.

The dust collecting attachment 250 according to this embodiment has the same construction as the above-described first embodiment except that the dust collecting cup 251 is attached to the side grip 208. Therefore, the same effects as the above-described first embodiment can be obtained. For example, the simply structured and low-cost dust collecting attachment 250 can be provided, the sealing member 263 can be easily replaced, dust generated during operation can be sucked by using a dust collector, and the dust collecting cup can be prevented from rotating together with the hammer bit when dust is caught between the dust collecting cup and the hammer bit.

(Third Embodiment)

Figure 14:
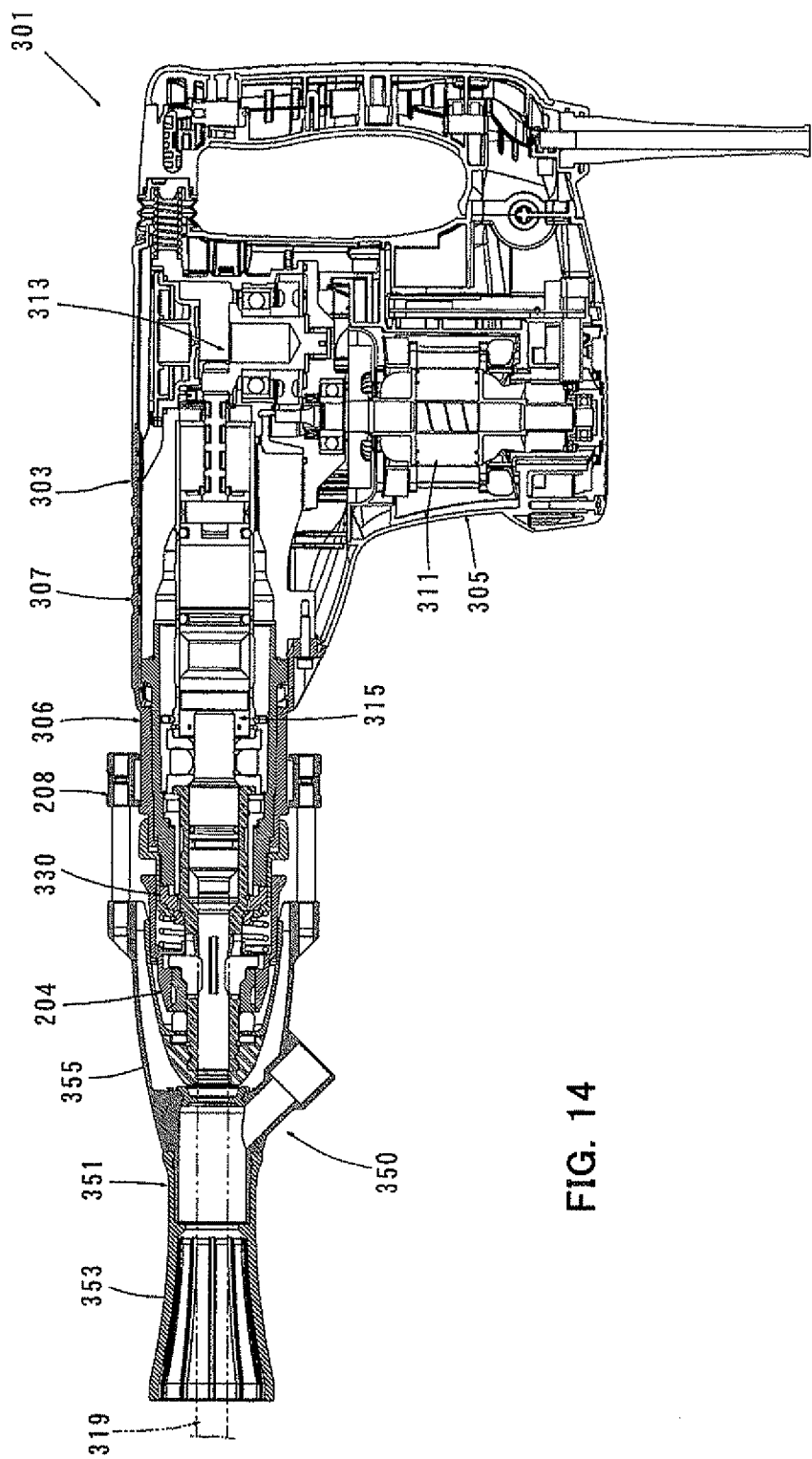
FIG. 14 is a sectional view showing an entire structure of a hammer with a dust collecting attachment attached thereto according to a third embodiment of the invention.

A third embodiment of the invention is now explained with reference to FIGS. 14 and 15. In this embodiment, a dust collecting attachment 350 is used on an electric hammer 301. Like the hammer drill 201 according to the second embodiment, the electric hammer 301 shown in FIG. 14 is of the type in which a driving motor 311 is vertically disposed such that its rotation axis extends in a direction transverse to an axial direction of a hammer bit 319. Further, the electric hammer 301 has a generally L-shaped body structure formed by a motor housing 305 and a gear housing 307. The electric hammer 301 has the same construction as the hammer drill 201 of the second embodiment except that an internal mechanism for driving the hammer bit 319 does not have a mechanism for transmitting rotation. Specifically, the internal mechanism of the electric hammer 301 includes a motion converting mechanism (crank mechanism) 313 that converts the rotating output of the driving motor 311 into linear motion, and a striking mechanism 315 that linearly moves in the longitudinal direction of the body 303 via components of linear motion of the motion converting mechanism 313 and thereby strikes the hammer bit 319. This internal mechanism is known and therefore it is not described in further detail.

Figure 15:
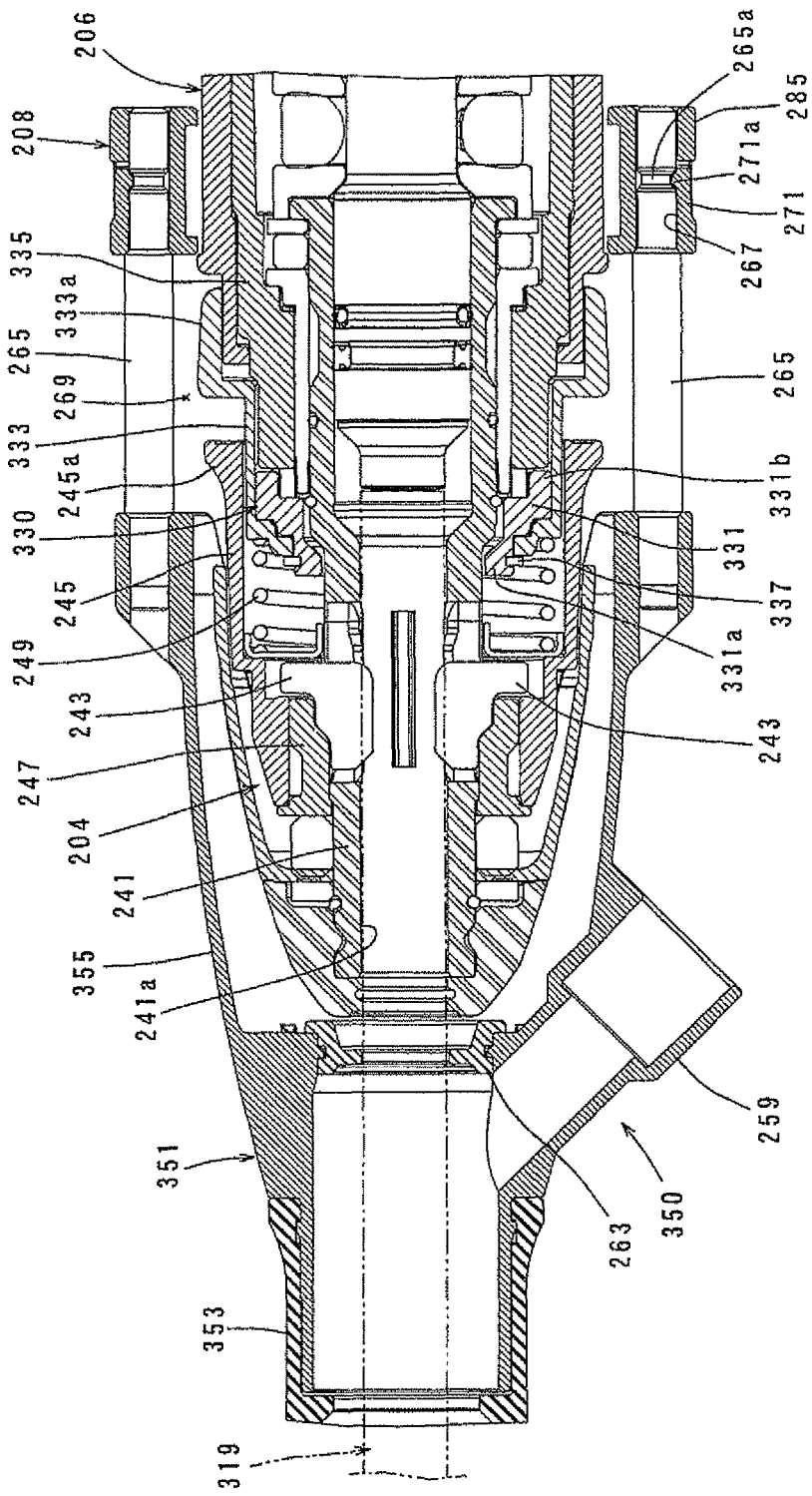
FIG. 15 is an enlarged view of part (the dust collecting attachment side) of FIG. 14.

As shown in FIG. 15, the electric hammer 301 according to this embodiment has the tool holding device 204 for holding the hammer bit 319 and a bit angle setting mechanism (variolock mechanism) 330 for setting the angle (positioning in the circumferential direction) of the hammer bit 319 held by the tool holding device 204, in the front end region of the body 303. Further, the tool holding device 204 has the same construction as in the above-described second embodiment, and therefore its components are given like numerals as in the second embodiment and not described.

The bit angle setting mechanism 330 mainly includes a generally annular lock ring 331 which serves to prevent the tool holding device 204 from rotating around its longitudinal direction and a generally cylindrical lock releasing sleeve 333 for bit angle adjustment which serves to release the tool holding device 204 from rotation prevention by the lock ring 331. The lock releasing sleeve 333 is a feature that corresponds to the "operating member for bit angle adjustment" according to the invention. The lock ring 331 is disposed on the middle of the tool holder 241 which is a component of the tool holding device 204, in its longitudinal direction, and can slide in the axial direction of the hammer bit 319. A lock claw 331a is formed on the inner circumferential surface of the lock ring 331 and engaged with a claw formed on the outside of the tool holder 241. Further, a lock claw 331b is formed on the rear end of the lock ring 331 in the longitudinal direction and engaged with a claw formed on the front end of a fixed sleeve 335 in the longitudinal direction. The fixed sleeve 335 is prevented from moving in the circumferential direction with respect to a barrel 306. With such a construction, the tool holding device 204 is prevented from rotating, so that the hammer bit 319 is prevented from unnecessarily rotating in the circumferential direction during hammering operation.

The lock releasing sleeve 333 is disposed at the rear of the bit removing tool sleeve 245 of the tool holding device 204 and on the outside of the lock ring 331 such that it can slide in the longitudinal direction together with the lock ring 331. When the user holds a knob 333a of the lock releasing sleeve 333 and slides it forward, the lock claw of the lock ring 331 can be disengaged from the claw of the lock sleeve 335, so that rotation of the tool holding device 204 is allowed.

The front end portion of the lock releasing sleeve 333 in the longitudinal direction extends into the bit removing tool sleeve 245 in the longitudinal direction. Further, an inward flange of an extending end of the lock releasing sleeve 333 is engaged with the front surface of the lock ring 331 and connected thereto via a retaining ring 337 so that the lock releasing sleeve 333 is integrated with the lock ring 331. The rear end portion of the lock releasing sleeve 333 is fitted onto the periphery of the front end portion of the barrel 306 and this rear end portion is defined as the knob 333a to be operated by the user's fingers. Thus, the knob 245a of the tool sleeve 245 and the knob 333a of the lock releasing sleeve 333 are adjacent to each other with a predetermined spacing in the axial direction of the hammer bit 319. Further, a biasing spring 249 is disposed between the lock releasing sleeve 333 and the bit removing tool sleeve 245 and elastically retains the lock ring 331 in a locked position in which the lock ring 331 is engaged with the claw of the lock sleeve 335 via the lock releasing sleeve 333.

The dust collecting attachment 350 is now explained. The dust collecting attachment 350 is configured such that the tip end of the hammer bit (also referred to as a bull point) 319 for hammering operation protrudes a predetermined distance from the front end of the dust collecting cup 351. As shown in FIG. 14, a cup body 353 of the dust collecting cup 351 is conically shaped (trumpet-shaped) such that its inside diameter increases toward the front end. Specifically, the opening area of the cup body 353 is maximized at the front end region. With such a configuration, the dust collecting cup 351 can be prevented from interfering with the workpiece and thus with the hammering operation, and at the same time, the ability of collecting dust (ease of catching dust) by the dust collecting cup 351 can be increased. Specifically, the dust collecting attachment 350 of this embodiment is suitably constructed for use in hammering operation in which the hammer bit 319 is caused to perform only the striking movement.

The dust collecting attachment 350 mainly includes the cylindrical dust collecting cup 351 which have both ends open and covers the front end region of the body 303, and a connecting hose (not shown) for connecting the dust collecting cup 351 to a dust collector. The dust collecting cup 351 includes the inextensible cup body 353 which is conically shaped (trumpet-shaped) such that its inside diameter increases toward the front end, and a cup mounting portion 355 which is fitted into the rear end of the cup body 353 and connected thereto. Further, the constructions other than described above, or specifically, the construction in which the cup mounting portion 355 has the dust discharge nozzle 259 and the sealing member 263 and the construction in which the cup mounting portion 355 is mounted to the side grip 208, are identical to those in the dust collecting attachment 250 for drilling operation as described in the second embodiment. Therefore, all the components of the dust collecting attachment 350 for hammering operation other than the above-described construction are given like numerals as in the dust collecting attachment 250 for drilling operation and are only briefly described.

As shown in FIG. 15, the cup mounting portion 355 is mounted to the side grip 208 via the two poles 265 which are inserted into the engagement holes 267 of the base 285. Further, the cup mounting portion 355 is retained in the mounting position by elastic engagement of the engagement protrusion 271a of the engagement member 271 with the engagement groove 265a of the pole 265. In the mounted state of the cup mounting portion 355, the two access spaces 269 for bit removal are defined by the two poles 265 in the circumferential direction between the cup mounting portion 355 and the base 285. The knob 245a of the tool sleeve 245 for bit removal and the knob 333a of the lock releasing sleeve 333 for bit angle adjustment which are described above face the access spaces 269.

In this embodiment, in the electric hammer 301 having the tool holding device 204 for holding the hammer bit 319 in the front end region of the body 303 and a bit angle locking mechanism 330 for locking the angle of the hammer bit 319 held by the tool holding device 204, the dust collecting attachment 350 is mounted to the side grip 208 attached to the barrel 306, via the two poles 265. Further, the access spaces 269 are provided in the dust collecting attachment 350 such that the knob 245a of the bit removing tool sleeve 245 in the tool holding device 204 and the knob 333a of the lock releasing sleeve 333 for bit angle adjustment in the bit angle setting mechanism 330 face each other via the access spaces 269. Therefore, according to this embodiment, the user can remove the hammer bit 319 and adjust the angle of the hammer bit 319 with the dust collecting attachment 350 left attached to the side grip 208, so that workability can be improved.

Further, the invention is not limited to this embodiment, but rather, may be appropriately changed or modified as necessary. For example, in the first embodiment, each of the access holes 169 is described as being formed by a rectangular opening having a closed perimeter, but the access hole 169 may be U-shaped having an open part in its perimeter, for example, on the side of the bore opening of the cup mounting portion 155. Further, the access holes 169 in the first embodiment and the access spaces 269 in the second embodiment may be intended not only for removal of the hammer bits 119, 219, but for angle setting of the hammer bits 119, 219. Further, the dust collecting cups 151, 252 are described as being extensible, but they may be inextensible. In the first embodiment, the engagement protrusion 165 may be provided on the barrel 106 and the engagement recess 167 may be provided in the dust collecting cup 151. Further, the numbers of the access holes 169 and the access spaces 269 are not limited to two each.

In the first and second embodiments, the hammer drill is explained as a representative example of the power tool, but the invention may be applied to a hammer which causes the hammer bits 119, 219 to perform only the striking movement in the longitudinal direction.

In view of the scope and spirit of the above-described invention, the following aspects can be provided.

(Aspect 1)

"The dust collecting attachment as defined in claim 1, wherein two such openings are formed oppositely on both sides of the axial center line of the dust collecting cup."

(Aspect 2)

"The dust collecting attachment as defined in claim 1, wherein the dust collecting cup includes a cup body and a cup mounting portion connected to the cup body, and an annular dust storage is formed in a region of connection of the cup mounting portion to the cup body and has an opening on a side facing an internal space of the cup body."

(Aspect 3)

"The dust collecting attachment as defined in (2), wherein a hose connecting port is formed in a bottom of the dust storage and communicates with the dust storage."

(Aspect 4)

"The dust collecting attachment as defined in claim 1, wherein the dust collecting cup is mounted by fitting onto a barrel in a front end region of the body."

(Aspect 5)

"The dust collecting attachment as defined in (4), wherein a plurality of engagement protrusions are formed in a circumferential direction on one of an inner surface of the dust collecting cup and an outer surface of the barrel, and a plurality of engagement recesses are formed in the circumferential direction on the other of the inner surface of the dust collecting cup and the outer surface of the barrel, and a mounting position of the dust collecting cup can be changed with respect to the barrel by selectively changing a position of engagement between the engagement protrusions and the engagement recesses in the circumferential direction."
(Aspect 6)

"The dust collecting attachment as defined in claim 1, wherein the dust collecting member is opposed to an auxiliary handle mounted to the body with a predetermined spacing in the longitudinal direction of the body, and the dust collecting member is supported by a plurality of poles which extend between the dust collecting member and the auxiliary handle."

DESCRIPTION OF NUMERALS 101 hammer drill (power tool)
103 body
104 tool holding device
105 motor housing
106 barrel
107 gear housing
109 handgrip
109a trigger
111 driving motor
113 motion converting mechanism
115 striking mechanism
117 power transmitting mechanism
119 hammer bit (tool bit)
123 intermediate shaft
125 rotating element
127 swinging ring
129 cylindrical piston
129a air chamber
131 small-diameter gear
133 large-diameter gear
135 striker
137 impact bolt
141 tool holder
141a bit insert hole
143 steel ball
145 tool sleeve (operating member)
145a knob
147 stopper ring
149 biasing spring
150 dust collecting attachment
151 dust collecting cup (dust collecting member)
153 cup body
153a non-bellows region
155 cup mounting portion
155a outer cylindrical portion
155b inner cylindrical portion
157 dust storage
159 dust discharge nozzle
161 cap (stopper)
163 sealing member
165 engagement protrusion
167 engagement recess
169 access hole (opening)
201 hammer drill (power tool)
203 body
204 tool holding device
205 motor housing
206 barrel
207 gear housing
208 side grip (auxiliary handle)
209 handgrip
209a trigger
215 striking mechanism
219 hammer bit (tool bit)
235 striker
237 impact bolt
241 tool holder
241a bit insert hole
243 engagement claw
245 tool sleeve (operating member)
245a knob
247 stopper ring
249 biasing spring
250 dust collecting attachment
251 dust collecting cup (dust collecting member)
253 cup body
255 cup mounting portion
259 dust discharge nozzle
263 sealing member
265 pole
265a engagement groove
267 engagement hole
269 access space (opening)
271 engagement member
271a engagement protrusion
273 connecting hose
275 cord guard
277 binding band
279 hose holding rib
281 grip mounting portion
283 band
285 base
285a engagement surface
286 nut
287 grip
289 threaded operation rod
301 hammer drill (power tool)
303 body
305 motor housing
306 barrel
307 gear housing
311 driving motor
313 motion converting mechanism
315 striking mechanism
319 hammer bit
330 bit angle setting mechanism
331 lock ring
331a lock claw
331b lock claw
333 lock releasing sleeve (operating member)
333a knob
335 fixed sleeve
337 retaining ring
350 dust collecting attachment
351 dust collecting cup (dust collecting member)
353 cup body
355 cup mounting portion

What we claim is:

1. A dust collecting attachment for a power tool having an operating member that is slidable in a longitudinal direction of a front end region of a tool body of the power tool, the operating member being for removal and/or bit angle adjustment of a tool bit coupled to the front end region of the tool body, and the dust collecting attachment comprising:

a dust collecting member attachable to the front end region of the tool body to cover at least a part of the operating member in such a manner as to surround the front end region around a longitudinal axis of the front end region, wherein the dust collecting member has two openings formed on opposite sides of an axial center line of the dust collecting member and in a region of the dust collecting member that faces the operating member in a state in which the dust collecting member is attached to the tool body and the operating member is operable by a user's fingers through the openings, wherein the dust collecting member includes a cup body and a cup mounting portion connected to the cup body, the cup mounting portion being connected to the cup body so as to define (i) an opening and (ii) an annular dust storage disposed outside of the cup body and in front of a sealing portion, and wherein a hose connecting port is formed on the cup mounting portion so as to be connected to the dust storage disposed in front of the sealing portion.

2. The dust collecting attachment as defined in claim 1, wherein
a connecting hose configured to connect the the dust collecting member to a dust collector can be connected to the hose connecting port.

3. The dust collecting attachment as defined in claim 2, wherein
the dust collecting member has a stopper configured to close the hose connecting port when the connecting hose is not connected to the hose connecting port.

4. The dust collecting attachment as defined in claim 2, wherein
the dust collecting member can be attached to the power tool at more than one position in the circumferential direction, and in the attached state, the dust collecting member is prevented from moving in the circumferential direction.

5. The dust collecting attachment as defined in claim 1, wherein the hose connecting port is formed in a bottom of the dust storage.

6. The dust collecting attachment as defined in claim 1, wherein the dust collecting member is mountable by fitting onto a barrel in the front end region of the body.

7. The dust collecting attachment as defined in claim 6, wherein:
a plurality of engagement protrusions are formed in a circumferential direction on one of an inner surface of the dust collecting member and an outer surface of the barrel,
a plurality of engagement recesses are formed in the circumferential direction on the other of the inner surface of the dust collecting member and the outer surface of the barrel, and
a mounting position of the dust collecting member can be changed with respect to the barrel by selectively changing a position of engagement between the engagement protrusions and the engagement recesses in the circumferential direction.

8. The dust collecting attachment as defined in claim 1, wherein
when attached to the tool body, the dust collecting member is opposed to an auxiliary handle mounted to the body with a predetermined spacing in the longitudinal direction of the body, and the dust collecting member is supported by a plurality of poles that extend between the dust collecting member and the auxiliary handle.

9. A power tool provided with the dust collecting attachment as defined in claim 1.

10. The dust collecting attachment as defined in claim 1, wherein the sealing portion is rearward of a bellows region of the cup body.

11. The dust collecting attachment as defined in claim 1, wherein the dust storage is rearward of a bellows region of the cup body.

12. The dust collecting attachment as defined in claim 1, wherein each of the openings is formed by two opposite and parallel sides that extend in the axial direction of the dust collecting member, one of the two parallel sides being longer than the other.

13. A dust collecting attachment for a power tool having an operating member that is slidable in a longitudinal direction of a front end region of a tool body of the power tool, the operating member being for removal and/or bit angle adjustment of a tool bit coupled to the front end region of the tool body, the dust collecting attachment comprising:

a dust collecting member attachable to the front end region of the tool body to cover at least a part of the operating member in such a manner as to surround the front end region around a longitudinal axis of the front end region, wherein the dust collecting member has an opening formed in a region of the dust collecting member that faces the operating member in a state in which the dust collecting member is attached to the tool body and the operating member is operable by a user's finger through the opening, wherein the dust collecting member includes a cup body and a cup mounting portion connected to the cup body, the cup mounting portion being connected to the cup body so as to define (i) an opening and (ii) an annular dust storage disposed outside of the cup body and in front of a sealing portion, and wherein a hose connecting port is formed on the cup mounting portion so as to be connected to the dust storage disposed in front of the sealing portion.

* * * * *